July 18, 1939.  J. B. McCALLEY  2,166,846

AUTOMATIC TRAILER CONSTRUCTION

Filed Aug. 2, 1937  4 Sheets-Sheet 1

INVENTOR.
JAMES B. McCALLEY
BY
ATTORNEYS.

July 18, 1939.                J. B. McCALLEY                2,166,846
                      AUTOMATIC TRAILER CONSTRUCTION
                         Filed Aug. 2, 1937        4 Sheets-Sheet 2

INVENTOR.
JAMES B. McCALLEY
BY
                              ATTORNEYS.

July 18, 1939.   J. B. McCALLEY   2,166,846
AUTOMATIC TRAILER CONSTRUCTION
Filed Aug. 2, 1937   4 Sheets-Sheet 3

INVENTOR.
JAMES B. McCALLEY
BY
Richey & Watts
ATTORNEYS.

July 18, 1939.   J. B. McCALLEY   2,166,846
AUTOMATIC TRAILER CONSTRUCTION
Filed Aug. 2, 1937    4 Sheets-Sheet 4
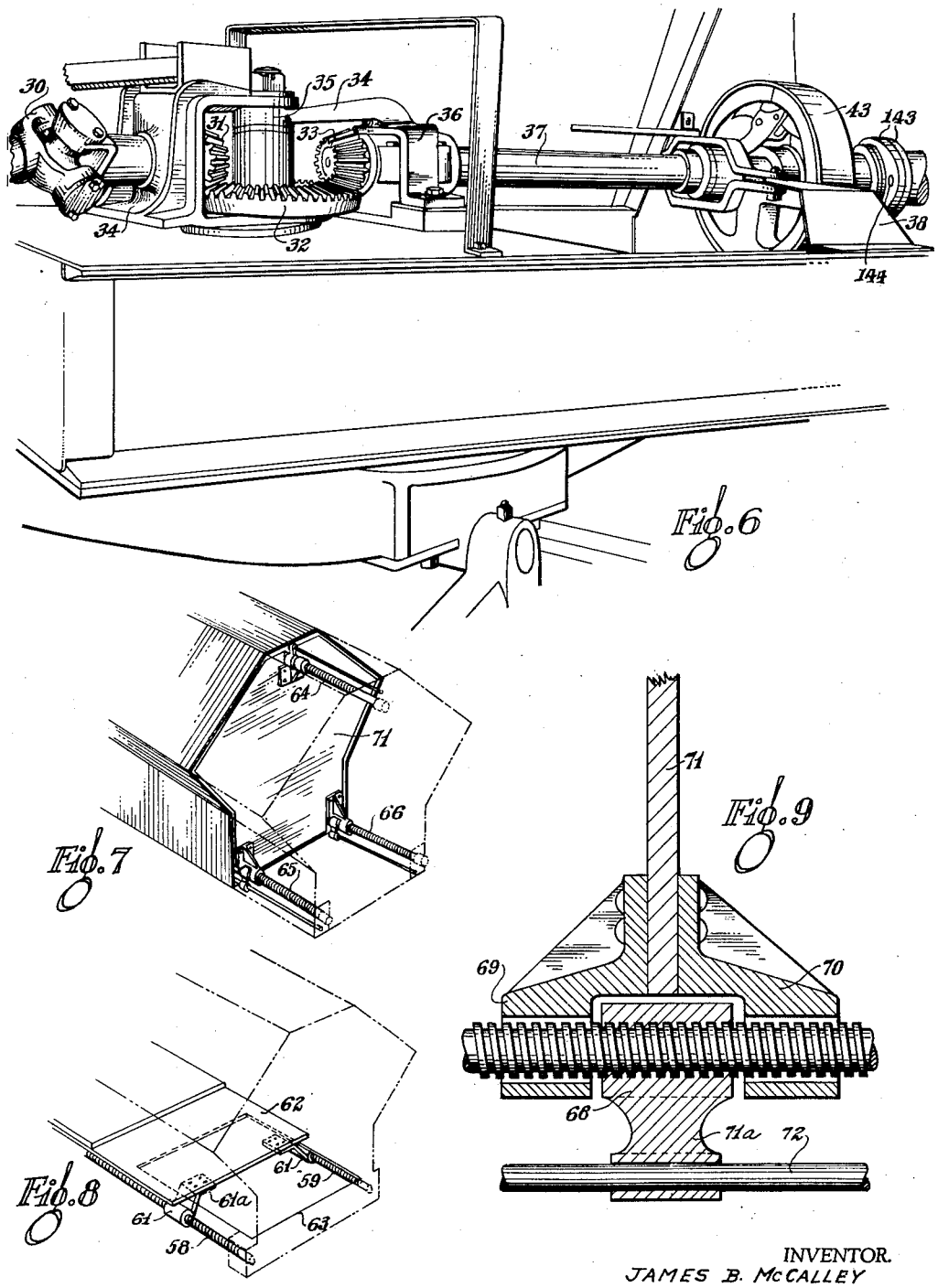
INVENTOR.
JAMES B. McCALLEY
BY
Ridley & Watts
ATTORNEYS.

Patented July 18, 1939

2,166,846

UNITED STATES PATENT OFFICE 2,166,846

AUTOMATIC TRAILER CONSTRUCTION

James B. McCalley, New York, N. Y., assignor to Barry Automatic Trailer Inc., New York, N. Y., a corporation of New York Application August 2, 1937, Serial No. 156,844

7 Claims. (Cl. 214—67)

This invention relates broadly to motor vehicles and more specifically to improvements in truck and trailer bodies of the type adapted for the conveyance of comminuted materials and refuse.

In congested city districts the disposal of refuse, from the standpoint of transportation, has been complicated by the requirement in certain cities, that garbage must be wrapped in paper before it will be accepted, moreover, the departments of sanitation in the larger cities now dispose of large quantities of other bulky wastage heretofore rejected. In the past, wagons, dump truck and similar open body vehicles could be employed in rubbish disposal with efficiency and economy, but with the advent of the municipal incinerator plants, the greater bulk of the waste material and the requirement of closed vehicle bodies for garbage while in transitude, a new economic problem is presented to the rubbish disposal department, which can only be solved by the use of equipment of greater pay load capacity and by a vehicle body design which will meet the specifications of the sanitation laws.

The present invention comprehends a vehicle body of the closed type in which access may be had to the interior through side panel doors divided to facilitate progressive loading of the lower portion of the vehicle body and doors within the top of the body to facilitate loading the vehicle from an overhead hopper chute.

The invention further contemplates the provision of a sliding floor panel to facilitate the discharge of the load through an aperture in the floor of the body when such panel is retracted. In addition the invention embodies a press or ram for effecting the discharge of the material or for compressing deformable wastage when it is desired to increase the carrying capacity of the body.

In addition to the foregoing objects, further advantages of the invention reside in a power transmission mechanism for the reciprocation of the compression plate, a wheel mounting which will accommodate the construction of a wider body and thus greater storage space within the vehicle and a drive gear unit between the engine and the body to facilitate operation of material handling mechanism.

Other objects and advantages more or less ancillary of the foregoing and the manner in which all the various objects are realized will appear in the following description which, considered in connection with the accompanying drawings, sets forth the preferred embodiment of the invention.

Referring to the drawings wherein the preferred embodiment of the invention is set forth:

Fig. 6 is a detailed view in perspective of the fragmentary portion of the transmission gearing between the motor vehicle and the body;

Fig. 7 is a diagrammatic view in perspective illustrating the form of the compression plate in relation to the wall contour of the vehicle body;

Fig. 8 is a diagrammatic view in perspective of the sliding floor plate showing the relation thereof to the vehicle side walls and floor construction;

Fig. 9 is a transverse sectional view through the compression plate, the supporting brackets therefor and the arrangement of the actuating screw coordinated therewith; and Fig. 10 is a fragmentary view in side elevation of the forward end of the chassis frame illustrating a modified form of the power take-off drive mechanism.

Figure 1:
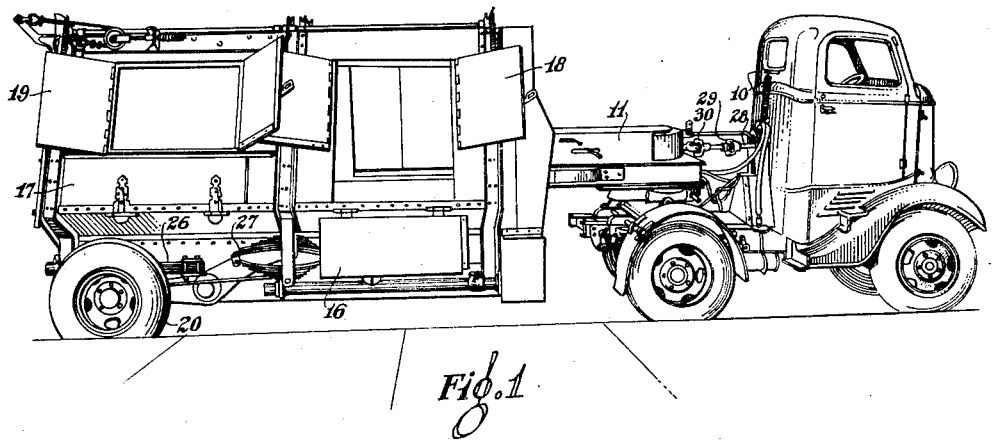
Fig. 1 is a view in perspective of the vehicle body embodying the present invention including the motor vehicle or tractor therefor.
Figure 2:
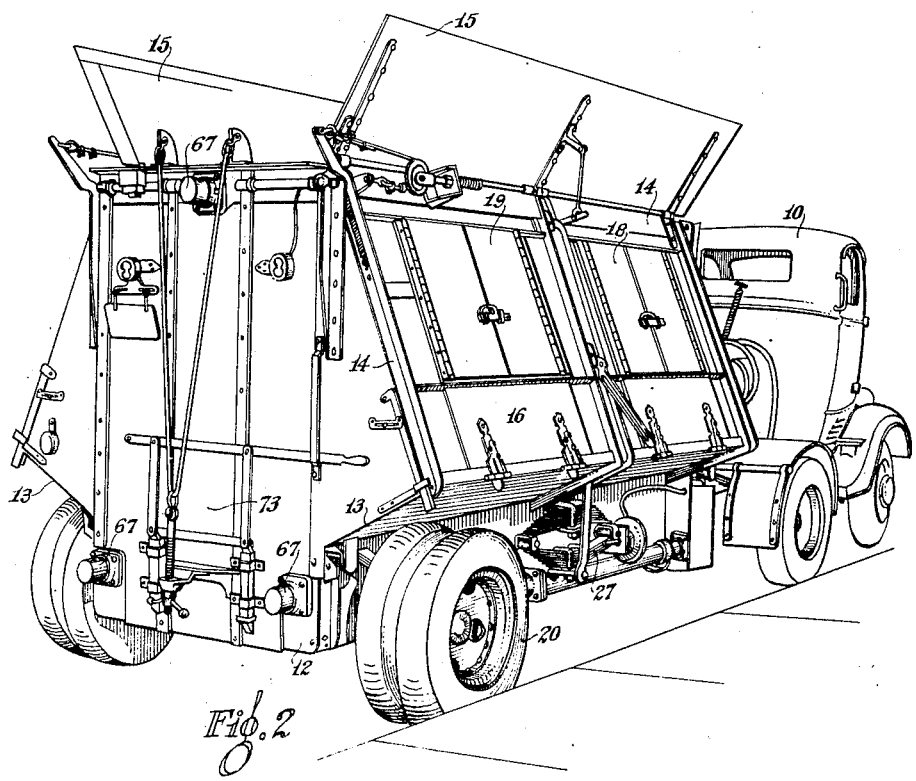
Fig. 2 is a view in perspective, shown on a somewhat enlarged scale, of the rearward portion of the body illustrating the arrangement of the side doors in their closed adjustment and the top doors in their actuated position and the rear door for the discharge of the load.

Referring first to Figs. 1 and 2, the vehicle in its entirety comprises a tractor 10 formed with a turn table or fifth wheel which supports the frame member of the vehicle body or trailer 11. The bed of the body 11 is framed with a rectangular base portion 12 having divergent walls 13 thereover which are connected with convergent side wall panels 14 terminating with a flat rectangular top portion closed by doors 15 hinged upon the edges of the side walls 14.

As will be seen in Fig. 1, the walls 14 are provided with drop panels or doors 16 and 17 above which are mounted swinging doors 18 and 19. The framing of the doors is arranged to provide a smooth, uninterrupted surface within the body in order to minimize the resistance imposed upon the compression plate actuating mechanism during the operation thereof, and latches or locks of suitable strength are provided to resist the compressive loads applied to the doors when the waste material within the body is compressed.

Figure 3:
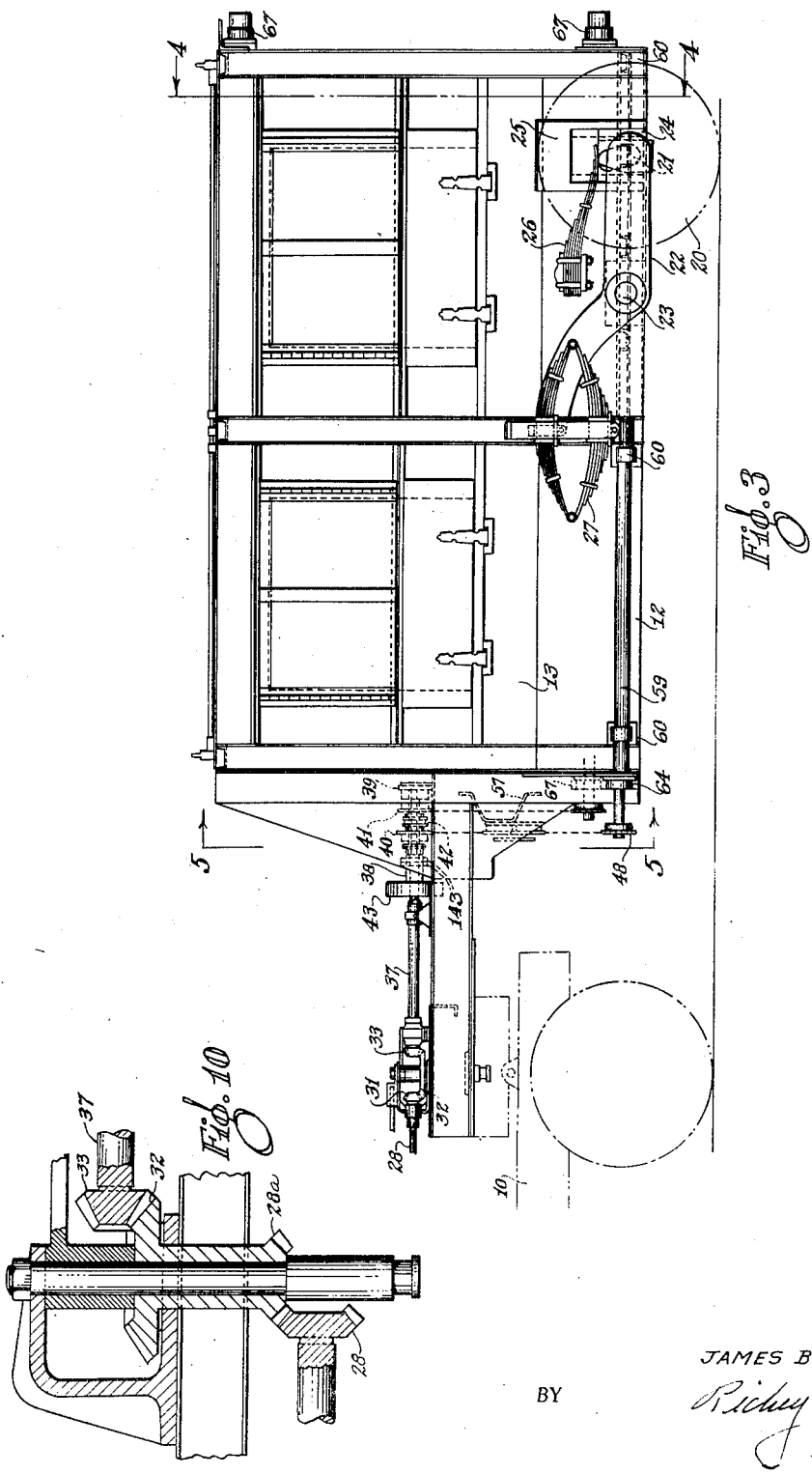
Fig. 3 is a side elevational view of the vehicle body illustrated in Figs. 1 and 2.
Figure 4:
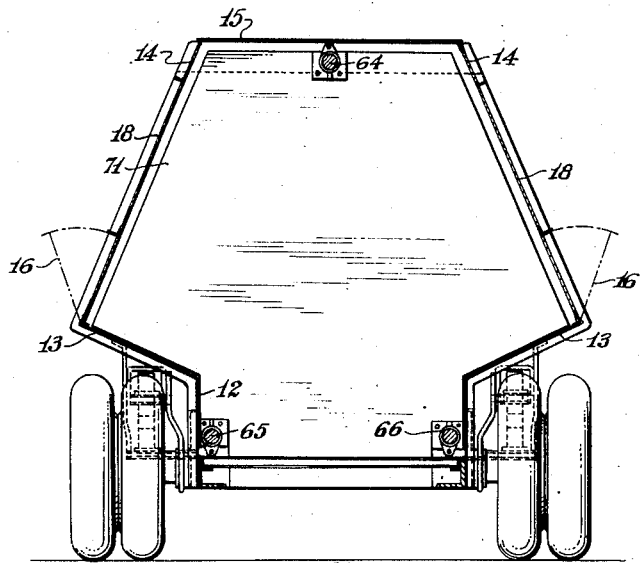
Fig. 4 is a vertical section through the rearward portion of the vehicle body, the section being taken on the plane indicated by the line 4—4 in Fig. 3.

In the chassis design the maximum body width of the base portion 12 of the vehicle is obtained by mounting the wheels 20 upon stub axles 21 (Fig. 3) on the end portions of beams 22 fulcrumed intermediate their ends upon pintles 23 secured to the chassis frame of the body. The wheel supporting end of the beam 22 is guided by a bearing block 24 adapted for vertical reciprocation within a frame 25 connected to the chassis at the base portion 12 of the vehicle body. The bearing block 24 is connected with a leaf spring 26 of conventional form while the opposed end of the beam 22 is connected with a vehicle road spring 27 of the full elliptic type. In such construction the load is transmitted through the pintles 23, to the beam 22 and in turn to the road springs 26 and 27 which are of suitable strength and periodicity to maintain the beam in normal equipoise. Thus it will be seen that as the wheels 20 engage road obstructions the beams 22 will rock upon their fulcrums, the movement of the end portions thereof being snubbed by the action of the springs.

As will be seen in Figs. 1 and 6, the tractor is provided with a power drive shaft 28 connected with the vehicle engine and coupled through universal joints 29 and 30 to a transmission gear set which comprises a miter gear 31, a gear wheel 32 and a second miter gear 33. The gear 32 is mounted for rotative movement within a bracket 34 pivotally supported upon the forward portion of the chassis frame 11 and rotatable thereon by an arm affixed to the cab of the tractor and guided within a channel secured upon the upper face of the bracket. Upon the bearing post for the gear 32 there is a collar 35 formed with a lateral extension which is connected with a bearing cage 36 which retains the miter pinion 33. The miter pinion 33 is keyed upon a shaft 37 journaled in brackets 38 and 39 mounted on the frame of the body 11. Adjacent the end of the shaft 37 there is a pair of sprockets 40 and 41 mounted on sleeves engageable with a sliding clutch keyed to the shaft 37 which is connected with a friction clutch 43 adapted to slip under predetermined torsional loads. The invention contemplates as an alternate safeguard to the drive gear construction a pair of companion flanges 143 having a pin 144 therebetween adapted to shear under application of excessive torsional strains.

The frame member of the body is fulcrumed upon the turn table or fifth wheel of the tractor 10 by a king pin of conventional form, the body and tractor being connected in the manner usually employed in trailer and tractor construction. When the tractor swings about its pivotal connection the miter gears 31 and 33 over race the teeth of the miter gear wheel 32, thus facilitating transmission of power from the shaft 30 to the shaft 37, irrespective the angular relation of the respective driving members.

As shown in Fig. 10, the application of power may be transmitted from the drive shaft 28 through suitable gearing 28a to the vehicle king pin or a shaft therein keyed to the miter gear wheel 32.

Figure 5:
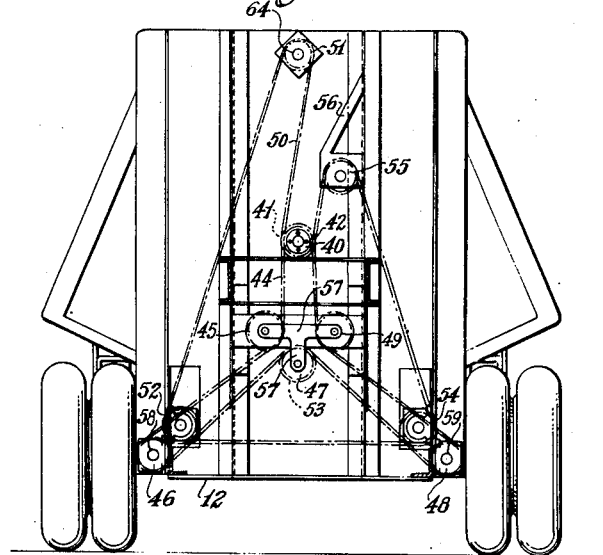
Fig. 5 is a vertical sectional view through a portion of the forward end of the body illustrating the arrangement of the drive gearing therefor, the section being taken on a plane indicated by the line 5—5 in Fig. 3.

As will be seen in Fig. 5, the sprocket 40 is engaged by an endless chain 44 which is trained over an idler sprocket 45, a sprocket 46 adjacent the base of the vehicle body 12, a second idler sprocket 47, a sprocket 48 on the opposed side of the base 12 and a third idler 49. The sprocket 41 is engaged by an endless chain 50 which is trained over a drive sprocket 51 located in the upper portion of the vehicle body, a second drive sprocket 52 adjacent the base of the body, an idler sprocket 53, a third drive sprocket 54 on the opposed side of the base 12 and a second idler sprocket 55 mounted on a bracket 56 intermediate the sprockets 41 and 51. The idler sprockets 45, 47, 49 and 53 are supported by a frame member 57 mounted on the end wall of the vehicle body 11.

The sprockets 46 and 48 are mounted on shafts 58 and 59, respectively, journaled in brackets 60 (Fig. 3) secured upon the outer face of the lower portion 12 of the body. These shafts are screw threaded throughout their lengths and are provided with traveler nuts 61 having arms thereon which extend beneath the frame and terminate with flanged portions 61a affixed to the floor plate 62, disposed over an opening 63 in the lower portion 12 of the vehicle body. The sprockets 51, 52 and 54 are mounted on the shafts 64, 65, and 66 respectively, being supported in anti-friction bearings retained in bearing cages 67 mounted upon the end walls of the vehicle body. The shafts 64, 65, and 66 are threaded throughout their length, preferably with a square or Acme type thread, and are provided with traveler nuts 68 disposed intermediate the brackets 69 and 70 secured respectively upon opposed faces of the compression plate 71. The traveler nuts 68 are formed with lugs 71a bored for sliding engagement upon guide rods 72 to prevent the rotation of the nuts 68 when the shafts are rotated.

In operation, when the vehicle body is partially filled and it is desired to compress the material therein for the purpose of gaining additional storage capacity in the body, the power take-off from the motor is set into operation, the clutch 43 being adjusted for engagement with the sprocket 41 to rotate the shafts 64, 65, and 66. Upon operation of these shafts the traveler nuts 68 will be advanced along the feed screws until the compression plate is translated to a point where the material is impinged upon the opposed end wall of the body and suitably compressed. The compression plate is retracted by operation of the reverse gearing in the power drive mechanism which rotates the shaft 37 and in turn the shafts 64, 65, and 66 in the opposite direction. When it is desired to unload the material in the body the power drive mechanism is set into operation with the sprockets 40 and clutch 42 adjusted for driving engagement so that the feed screws 58 and 59 will be rotated in a direction which will cause the retraction of the floor plate 62, then the clutch is engaged with the sprocket 41 to effect the translation of the compression plate 71 which forces the material forwardly through the opening 63 in the floor of the body.

Although the floor plate and actuating mechanism therefor is shown as disposed in the forward portion of the body it is obvious that the mechanism may be arranged in the rearward portion of the body and the compression plate 69 organized for translation in the opposite direction so that the load may be ejected through an opening in the floor adjacent the rear portion of the body or through a door 73 in the end wall of the vehicle.

In the foregoing description reference is made to the aptitude of the apparatus for handling refuse and waste materials. However, it is to be understood that the mechanisms embodying the invention are in nowise limited for use with such materials but that other substances, such for example as crushed stone, gravel and comminuted building materials may be handled in a vehicle body of this type and form. In handling the latter materials the sliding floor panel may be partially open during the discharge operation so the comminuted materials may be evenly spread upon the ground (by simultaneous operation of the compression plate) while the vehicle is in motion.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a motor vehicle embodying an engine and a power take-off gear mechanism, a vehicle body comprising top, bottom, side and end walls, doors in the top and side walls thereof, threaded shafts within said body adjacent the top and bottom walls thereof, traveler nuts on said shafts, a plate supported on said nuts and disposed within said body parallel the end walls thereof, a pair of threaded shafts mounted on said body adjacent the bottom thereof, traveler nuts on said last named shafts, a floor plate mounted on said nuts and disposed parallel the floor of the body over an opening therein, driving connections from said power take-off gear mechanism to the first and second named shafts and a clutch between said power take-off gear mechanism and said driving connections for the control of either the first or second named shafts.

2. In a motor vehicle embodying an engine and a power take-off gear mechanism, a vehicle body comprising top, bottom, side and end walls, doors in the top and side walls thereof, threaded shafts within said body adjacent the top and bottom walls thereof, traveler nuts on said shafts, a plate supported on said nuts and disposed within said body parallel the end walls thereof, driving connections operatively coupled with said power take-off drive gear mechanism and said shafts, a friction clutch adapted to slip under a predetermined load, connected with said driving connections, a floor plate mounted over an opening in the bottom of said body and means for moving said floor plate longitudinally of said vehicle body back and forth over said opening.

3. In a motor vehicle embodying an engine and a power take-off gear mechanism, a vehicle body comprising top, bottom, side and end walls, doors in the top and side walls thereof, a threaded shaft adjacent the top of said body, a pair of threaded shafts adjacent the bottom of said body, sprockets on said shafts, a sprocket on said power take-off gear mechanism, an endless chain trained over each of said sprockets, traveler nuts on each of said shafts, a plate supported on said nuts and disposed vertically within said body, a second pair of threaded shafts mounted on said body sprockets thereon, a second sprocket on said power take-off gear mechanism, a chain trained over each of said second sprockets, traveler nuts on said second shafts, a plate supported on said nuts and disposed parallel the floor over an opening therein and a clutch coordinated with power take-off drive gear mechanism and the sprockets thereon for the control of the first and second named shafts.

4. In a motor vehicle embodying an engine and a power take-off gear mechanism, a vehicle body comprising top, bottom, side and end walls, doors in the top and side walls thereof, a gear bracket pivotally mounted on said body, a miter gear wheel rotatably mounted thereon, a miter pinion connected with said power take-off gear mechanism and intermeshed with said miter gear, a second miter pinion intermeshed with said miter gear, a shaft keyed thereto, a vertically disposed plate within said body, means for reciprocating said plate, a horizontally disposed plate adjacent the bottom of said body superjacent an opening in the floor thereof, means for reciprocating said plate, and driving connections coupled with said shaft for said second miter gear and said reciprocating means for said vertical and said horizontal plates.

5. In a motor vehicle embodying an engine and a power take-off gear mechanism, a vehicle body comprising top, bottom, side and end walls, doors in the top and side walls thereof, a vertically disposed plate within said body, means coordinated with said power take-off gear mechanism for reciprocating said plate, a horizontally disposed plate within said body superjacent an opening in the floor thereof, means coordinated with said power take-off gear mechanism for reciprocating said horizontally disposed plate, driving connections intermediate said power take-off gear mechanism and said reciprocating means for said vertical and horizontal plates and a pin in said driving connections adapted to shear under a predetermined load.

6. In a motor vehicle embodying an engine and a power take-off gear mechanism, a vehicle body comprising top, bottom, side and end walls, doors in the top and side walls thereof, a vertically disposed plate within said body, means coordinated with said power take-off gear mechanism for reciprocating said plate, a horizontally disposed floor plate within said body superjacent an opening in the floor thereof, and subjacent a portion of the floor, means coordinated with said power take-off gear mechanism for reciprocating said floor plate, a friction drive mechanism adapted to slip under a predetermined load associated with said power take-off gear drive mechanism and a clutch between said power take-off gear mechanism and the reciprocating means for the vertical plate and floor plate for controlling the operation of either.

7. In a tractor having a power drive take-off mechanism, an enclosed trailer body having an opening in the floor thereof pivotally connected to said tractor, a king pin constituting the pivotal connection between said tractor and said trailer, a gear on said king pin intergeared with said power take-off, a vertically disposed plate within said trailer body, a floor plate within said trailer body, movable back and forth over said opening, screw shafts operatively connected with said plates, driving connections between said screw shafts and said gear on said king pin and a clutch associated with said driving connections to control the advance or retraction of either the vertical plate or the floor plate.

JAMES B. McCALLEY.